April 14, 1925.
E. H. GENUIT
STOCK FEEDER
Filed Sept. 5, 1924
1,533,796
2 Sheets-Sheet 2
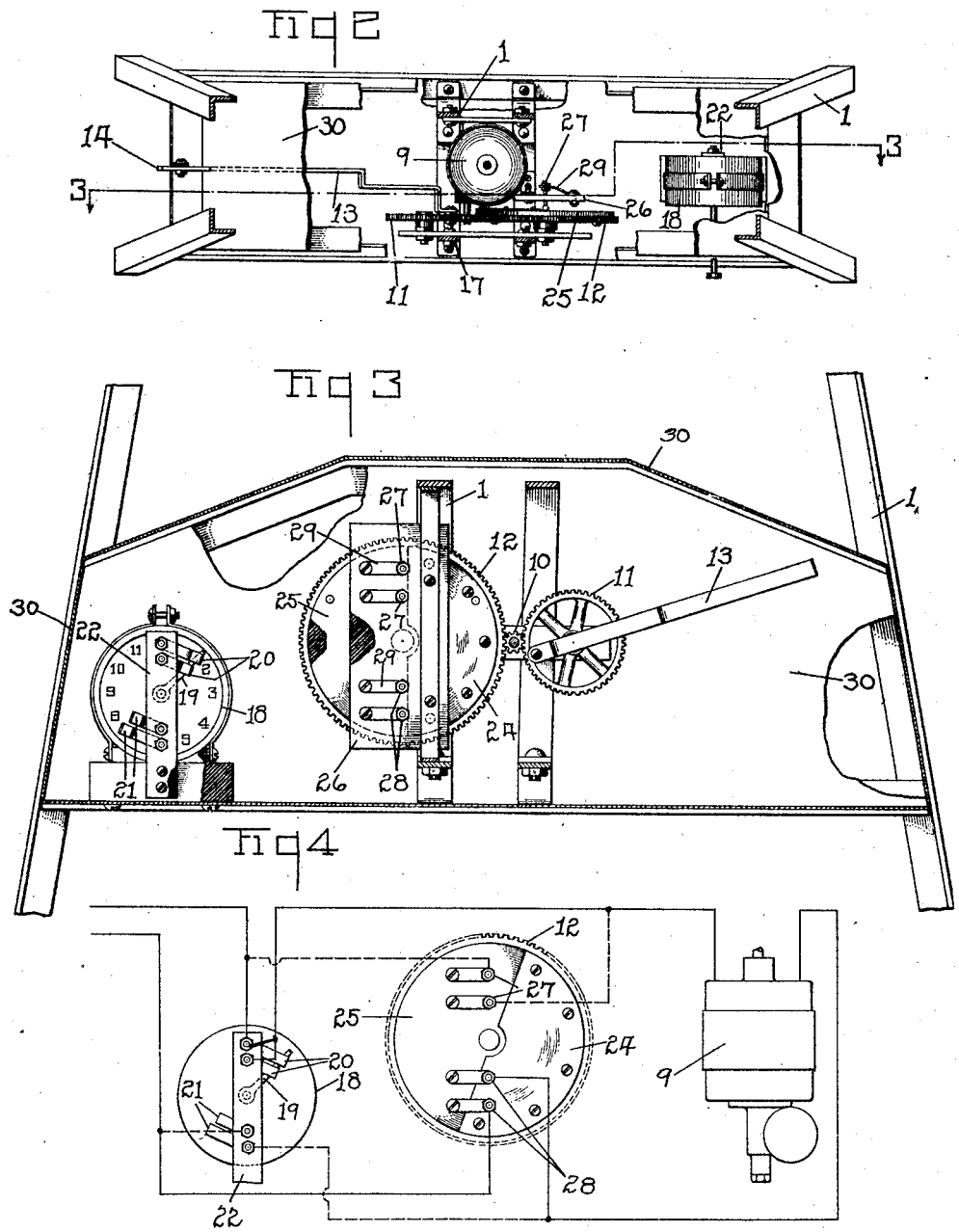

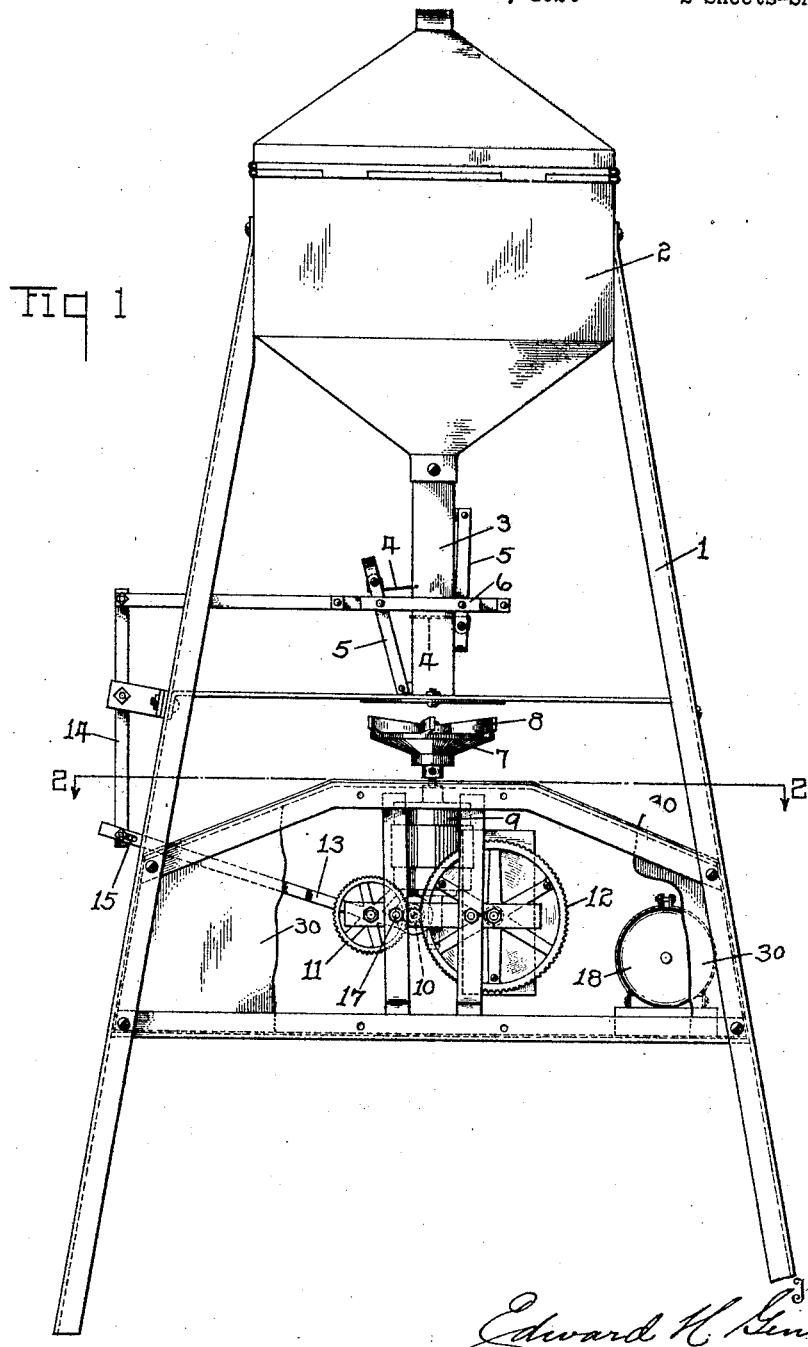

Patented Apr. 14, 1925.

1,533,796

UNITED STATES PATENT OFFICE.

EDWARD H. GENUIT, OF NAPOLEON, OHIO.

STOCK FEEDER.

Application filed September 5, 1924. Serial No. 736,006.

*To all whom it may concern:*

Be it known that I, EDWARD H. GENUIT, a citizen of the United States, and a resident of Napoleon, in the county of Henry and State of Ohio, have invented a new and useful Stock Feeder, which invention is fully described in the following specification.

In the stock feeding distributing mechanism commonly used, the operation of the mechanism is dependent upon some performance of the stock, such as stepping or standing on a controlling element or trip, or pressing an actuating means, such as in the case of chickens, scratching, and accidently striking a cord or a chain which causes the mechanism to release a quantity of the feed. In some cases, provision is made for the feed to descend, and in falling, striking a sloping surface and glancing therefrom to distribute the feed over an area of more or less width or diameter. By my invention, the feed is delivered at regular intervals in predetermined amounts, irrespective of any accidental or intentional movement of any of the stock. In the case of chicken feeding, the feed is scattered by a rotatable member that is rotated at a high speed for a given period of time, in order that the material may be thrown at some distance, that is, over a large area, and also whereby the delivery of all material that is released each time may be insured.

In embodiments of my invention, a time regulated mechanism is provided for periodically connecting an actuating mechanism with a dispening means, which causes the periodic distribution and which insures the entire delivery of all of the alloted amount of feed in each operation.

The invention may be contained in structures of different forms and still be within the purview of the novelty of my invention. To illustrate a practical application of the invention, I have selected a structure containing the invention and shall describe it hereinafter. The structure selected as an example is shown in the accompanying drawings.

Figure 1 is a front view of a chicken feeder. Figure 2 is a view of a section taken on the line 2—2 indicated in Fig. 1. Figure 3 is a view of a section taken on the line 3—3 indicated in Fig. 2. Figure 4 is a diagram of the connections of parts of the mechanism used for operating the feeder.

The feeder is provided with a suitable frame 1 for supporting the parts of the mechanism. A hopper and feed container 2 is secured in the upper end of the frame 1. The hopper portion of the container directs the feed into the chute 3, which is provided with a pair of plates 4, one or the other of which closes the passageway through the chute 3. The plates 4 are connected to pivoted arms 5 and also are connected to a cross bar 6, and so as to cause one plate 4 to close the chute 3 while the other plate 4 is drawn from the chute 3, that is, to open the chute 3 at the point where the said other plate is located. This arrangement forms an escapement for the material to allow predetermined amounts of the feed to pass from the container 2. Each time that the upper plate 4 is drawn from the chute 3, the space of the chute 3 below the upper plate 4 and extending to the lower plate 4 is filled with the feed, whereupon the upper plate 4 is inserted into the chute and the lower plate 4 is withdrawn, which allows the feed located below the upper plate 4 to escape and pass down through the chute 3.

The feed is received by a suitable rotatable disc 7 having wings 8 and so that when the disc 7 is rotated, the feed will be thrown from the disc and scattered. In order to rotate the disc 7 at a sufficient high speed, it is connected to an electric motor 9. The circuit of the motor 9 is controlled by a switch that may be automatically operated to periodically start the motor and cause it to operate during a definite period of time, in order to insure a wide distribution of the feed, or the switch that controls the circuit of the motor may be operated by the stock, the construction being such as to cause the motor to operate during a definite period of time to cause all of the feed delivered to the disc or other suitable distributing means to be scattered, or the motor may be used to regulate the quantity of feed that is supplied during succeeding short periods of time.

In the form of construction shown in the drawing, the motor 9, which is suitably supported by the frame 1, is not only connected to the distributing disc 7, but also to the pinion 10 that drives the gear wheels 11 and 12. The gear wheel 11 is connected by means of a link 13 and a lever 14 to the rod 6 that operates the feed escapement. The connection between the link 13 and the lever 14 may be made adjustable, as by means of the slot and bolt 15 in order to regulate movement of the arms 5 of the escapement. The link 13 may be connected to the gear wheel 11 by means of the pin or bolt 17. The connections between the gear wheel 11 and the cross bar 6 are such as to cause the operation of the escapement while the speed of the motor 9 is increasing in its rate, and so that by the time the portions of the feed are delivered to the disc 7, the disc 7 is being rotated substantially at the maximum speed developed by the motor, which insures wide distribution of the feed and also distribution of all of the feed that is allowed to escape to the disc 7.

The wheel 12, which is also driven by the pinion 10, has preferably a diameter that is twice as great as that of the wheel 11 and so that upon a semi-rotation of the wheel 12, the wheel 11 will be rotated around once, which will cause a single operation of the escapement.

The wheel 12 is provided with means for opening the circuit of the motor upon the completion of each half revolution of the wheel 12. The circuit of the motor is closed by a switch that is operated in any desired manner. In the form of construction shown, it is operated by means of a periodically operated mechanism that may be broadly described as a clock mechanism. The clock 18 is suitably secured to the frame 1 and is provided with a contact 19. The contact 19 may be connected to the minute arbor of the clock and so as to make contact with one or more pairs of contacts, such as the contacts 20 and 21, which are so located as to cause the circuit connected to the contacts 20 and 21 to be closed every half hour. The contacts 20 and 21 are supported on an insulating bar 22 and are electrically connected in the motor circuit either in parallel or in opposite sides of the circuit, means being provided in the particular arrangement shown for closing one branch of the circuit in advance of the closing of another branch of the circuit, and so that the motor will start when the said other branch of the circuit is closed. In order to close the branches of the circuit of the motor, and also to open the circuit of the motor, a means is connected to the motor which will be operated after the motor has operated a desired interval of time. The wheel 12 is provided with a segmental contact 24 that may be made substantially semi-circular in form and insulatingly secured to the wheel 12, as by the insulating disc 25, that is secured to the wheel and the screws that secure the segment 24 to the disc. A plate 26 preferably of insulating material is supported at the rear of the wheel 12 and so as to face the side of the wheel. Spring pressed contacts 27 extend through the plate 26 and are pressed by means of the springs 29 towards the wheel 12 and so as to make contact either with the segmental contact 24 or the insulating disc 25. In the form of construction shown, the contacts 27 and 28 are arranged in pairs, two pairs of the contacts being provided to correspond with the two pairs of contacts 20 and 21 that are closed by the contact 19 of the clock mechanism. As shown in the diagram, one terminal of the motor is connected to one of the contacts 20 and to one of the contacts 27. The other of the contacts 20 and 27 are connected with the source of current, while the other terminal of the motor is connected to one of the contacts 21 and one of the contacts 28, and the other of the said contacts 21 and 28 being connected to the source of current. The arrangement of the contacts 27 and 28 and the segmental contact 24 is such that one of the pairs of contacts 20 and 21 is short circuited by one of the pairs of contacts 27 and 28, and when the contact 19 closes the circuit between the other of the pairs of contacts 20 or 21, the circuit through the motor is closed, the current passing through the pair of contacts 27 and 28 that is closed by the contact 24. During the operation of the motor, the segment 24 is rotated and one of the pairs of contacts 27 and 28 is opened, while the other pair of contacts is closed. This last-named pair however, being on the same side or leg of the circuit that the contacts 20 or 21 are located on, that first started the motor, the motor will discontinue its operations, but the inertia of the motor and the parts connected therewith will carry the segment 24 into contact with the pair of contacts, and thus establish a good connection for the subsequent completion of the circuit by one or the other of the contacts 20 or 21. In order to overcome the inertia of the motor, the wings 8 located on the discs 7 may be made so as to have considerable width, and consequently some resistance of the air will be afforded and will slow the motor down. Also the friction of the contacts 27 and 28 that are pressed against the faces of the discs 25 and segment 24 causes the motor to come to a stop quite promptly after the segment 24 has made good contact with one or the other of the pairs of contacts 27 and 28.

Thus the motor operates during a half revolution of the larger wheel 12. The smaller wheel 11 being one-half the size of the wheel 12 will bring the pin 17 to which the escapement is connected to substantially the same point that it was when the motor started. Thus in each case the escapement performs a single back and forth movement to allow the allotted amount of the feed to pass to the disk 7 and be scattered by rotation of the disk.

The mechanism, particularly the motor, the wheels and the clock, may be enclosed in a suitable sheet metal compartment formed by the walls 30.

I claim:—

1. In a stock feeder, a source of current, an electric motor, a feed escapement operated by the motor, a distributing member actuated by the motor, a clock for completing the circuit of the motor and a controlling means for discontinuing the operation of the motor.

2. In a stock feeder, a source of current, an electric motor, a feed escapement operated by the motor, a distributing member actuated by the motor, a clock for completing the circuit of the motor and a controlling means operated by the motor for discontinuing the operation of the motor.

3. In a stock feeder, a feed escapement, means for distributing the feed, and an electric motor for operating the escapement and the distributing means.

4. In a stock feeder, a feed escapement, means for distributing the feed, an electric motor for operating the escapement and the distributing means, and a clock mechanism for periodically starting the motor.

5. In a stock feeder, a feed escapement, means for distributing the feed, a circuit breaker, and an electric motor for operating the said escapement, the distributing means and the circuit breaker.

6. In a stock feeder, a feed escapement, means for distributing the feed, a circuit breaker, an electric motor for operating the said escapement, the distributing means and the circuit breaker, and a clock mechanism for closing the circuit of and starting the motor.

7. In a stock feeder, a feed escapement, a feed distributor, a source of current, a motor operating the feed escapement and the feed distributor, a clock mechanism for controlling the motor, means for connecting the source of current with one terminal of the motor through the clock mechanism and means for connecting the other terminal of the motor with a source of current.

8. In a stock feeder, a feed escapement, a feed distributor, a source of current, a motor operating the feed escapement and the feed distributor, means for controlling the motor, means for connecting the source of current with one terminal of the motor through the clock mechanism and means for connecting the other terminal of the motor with a source of current.

9. In a stock feeder, a feed escapement, a feed distributor, a motor for operating the feed escapement and the feed distributor, a source of current and branch circuits connected thereto, a means located in one branch for completing the circuit to start the motor and means located at another branch for opening the circuit to stop the motor.

10. In a stock feeder, a feed escapement, a feed distributor, a motor for operating the feed escapement and the feed distributor, a source of current, branch circuits connected to the said source and to the terminals of the motor, a means for closing a branch of the circuit located on each side of the motor to start the motor and means for opening a branch of the circuit located on each side of the motor to stop the motor.

In testimony whereof, I have hereunto signed my name to this specification.

EDWARD H. GENUIT.